United States Patent
Komori et al.

(10) Patent No.: US 8,549,868 B2
(45) Date of Patent: Oct. 8, 2013

(54) REFRIGERATION CYCLE APPARATUS

(75) Inventors: Kou Komori, Nara (JP); Yuichi Yakumaru, Osaka (JP); Tomoichiro Tamura, Osaka (JP); Masaya Honma, Osaka (JP); Hiroki Hayashi, Tokyo (JP)

(73) Assignee: Panasonic Corporation, Osaka (JP)

( * ) Notice: Subject to any disclaimer, the term of this patent is extended or adjusted under 35 U.S.C. 154(b) by 845 days.

(21) Appl. No.: 12/438,219

(22) PCT Filed: Jun. 20, 2008

(86) PCT No.: PCT/JP2008/001604
§ 371 (c)(1),
(2), (4) Date: Feb. 20, 2009

(87) PCT Pub. No.: WO2009/001535
PCT Pub. Date: Dec. 31, 2008

(65) Prior Publication Data
US 2010/0229583 A1 Sep. 16, 2010

(30) Foreign Application Priority Data
Jun. 22, 2007 (JP) .................... 2007-164606

(51) Int. Cl.
*F25B 7/00* (2006.01)
*F25B 41/00* (2006.01)
*F25B 41/04* (2006.01)
*F25B 27/00* (2006.01)

(52) U.S. Cl.
USPC .................. 62/238.7; 62/79; 62/113; 62/205

(58) Field of Classification Search
USPC .................. 62/149, 160, 228.5, 238.7, 324.1, 62/324.4, 510, 79, 205, 279, 324.06, 113
See application file for complete search history.

(56) References Cited

U.S. PATENT DOCUMENTS

| | | | | |
|---|---|---|---|---|
| 3,919,859 | A * | 11/1975 | Ross | 62/503 |
| 5,692,389 | A * | 12/1997 | Lord et al. | 62/222 |
| 6,401,472 | B2 * | 6/2002 | Pollrich et al. | 62/228.4 |
| 6,467,288 | B2 * | 10/2002 | Kuroki et al. | 62/197 |
| 2002/0036080 | A1 * | 3/2002 | Itoh et al. | 165/202 |
| 2004/0040339 | A1 * | 3/2004 | Matsumoto et al. | 62/470 |
| 2004/0114916 | A1 * | 6/2004 | Reichelt | 392/307 |
| 2005/0109490 | A1 * | 5/2005 | Harmon et al. | 165/133 |
| 2005/0115260 | A1 * | 6/2005 | Yap | 62/238.6 |
| 2005/0132729 | A1 * | 6/2005 | Manole | 62/149 |

(Continued)

FOREIGN PATENT DOCUMENTS

| | | | |
|---|---|---|---|
| DE | 4127754 | * | 2/1993 |
| DE | 4127754 A1 | * | 2/1993 |

(Continued)

*Primary Examiner* — Frantz Jules
*Assistant Examiner* — Henry Crenshaw
(74) *Attorney, Agent, or Firm* — Hamre, Schumann, Mueller & Larson, P.C.

(57) ABSTRACT

A refrigeration cycle apparatus (50) includes: a main refrigerant circuit (21) having a compressor (1), a radiator (2), a first expansion mechanism (5), a second expansion mechanism (6), and an evaporator (4); an injection passage (22) for supplying an intermediate-pressure refrigerant to an injection port 1c of the compressor 1; and a water circuit (30) through which water to be heated in the radiator (2) flows. The refrigeration cycle apparatus (50) includes a sub heat exchanger (3) for cooling the water in the water circuit (30) by exchanging heat between the refrigerant in the injection passage (22) and the water to be heated in the radiator (2).

11 Claims, 8 Drawing Sheets

(56) References Cited

U.S. PATENT DOCUMENTS

| | | | |
|---|---|---|---|
| 2005/0144973 A1* | 7/2005 | Matsumoto et al. | 62/470 |
| 2005/0183447 A1* | 8/2005 | Matsumoto et al. | 62/470 |
| 2005/0262870 A1* | 12/2005 | Narayanamurthy et al. | 62/434 |
| 2006/0096314 A1* | 5/2006 | Nakamura et al. | 62/498 |
| 2006/0174639 A1* | 8/2006 | Lee et al. | 62/160 |
| 2006/0201188 A1* | 9/2006 | Kopko | 62/333 |
| 2007/0041852 A1* | 2/2007 | Masuda | 417/410.3 |
| 2008/0011014 A1* | 1/2008 | Renz et al. | 62/510 |

FOREIGN PATENT DOCUMENTS

| | | |
|---|---|---|
| JP | 61-190252 A | 8/1986 |
| JP | 3-105173 A | 5/1991 |
| JP | 3-211361 A | 9/1991 |
| JP | 2001-241788 A | 9/2001 |
| JP | 2002-098429 A | 4/2002 |
| JP | 2003-240369 A | 8/2003 |
| JP | 2004-132658 A | 4/2004 |
| JP | 2006-308278 A | 11/2006 |

* cited by examiner

REFRIGERATION CYCLE APPARATUS

TECHNICAL FIELD

The present invention relates to a refrigeration cycle apparatus including a refrigerant circuit and a fluid circuit through which a fluid to be heated by a refrigerant in the refrigerant circuit.

BACKGROUND ART

Figure 6:
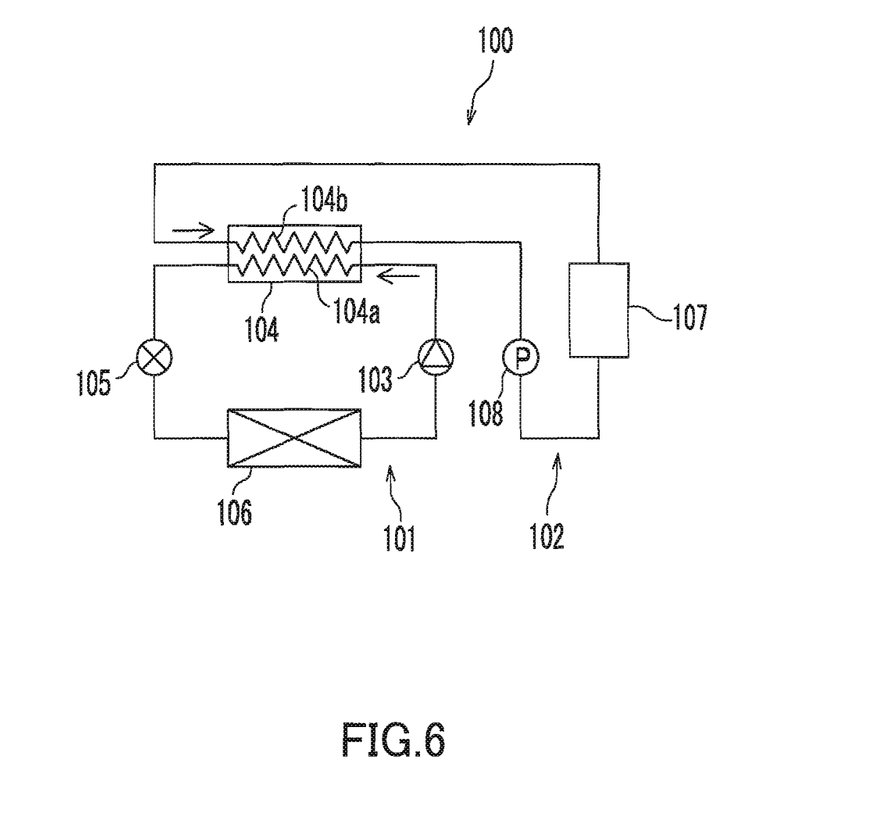
FIG. 6 is a configuration diagram of a conventional refrigeration cycle apparatus.

As shown in FIG. 6, there has been known conventionally a refrigeration cycle apparatus 100 including: a fluid circuit 102 through which a fluid, such as water and brine used for water heating and space heating, for example, flows; and a refrigerant circuit 101 for heating the fluid in the fluid circuit 102. The refrigerant circuit 101 includes: a compressor 103 for compressing a refrigerant; a radiator 104 for radiating heat from the refrigerant compressed in the compressor 103; an expansion mechanism 105 for expanding the refrigerant from which heat has been radiated in the radiator 104; and an evaporator 106 for evaporating the refrigerant expanded in the expansion mechanism 105. The radiator 104 has a high-temperature side flow passage 104a through which the refrigerant flows and a low-temperature side flow passage 104b through which the fluid in the fluid circuit 102 flows. In this radiator 104, the fluid in the low-temperature side flow passage 104b is heated by the refrigerant in the high-temperature side flow passage 104a. The fluid circuit 102 is provided with a tank 107 for storing the fluid heated in the radiator 104 and with a pump 108.

Figure 7:
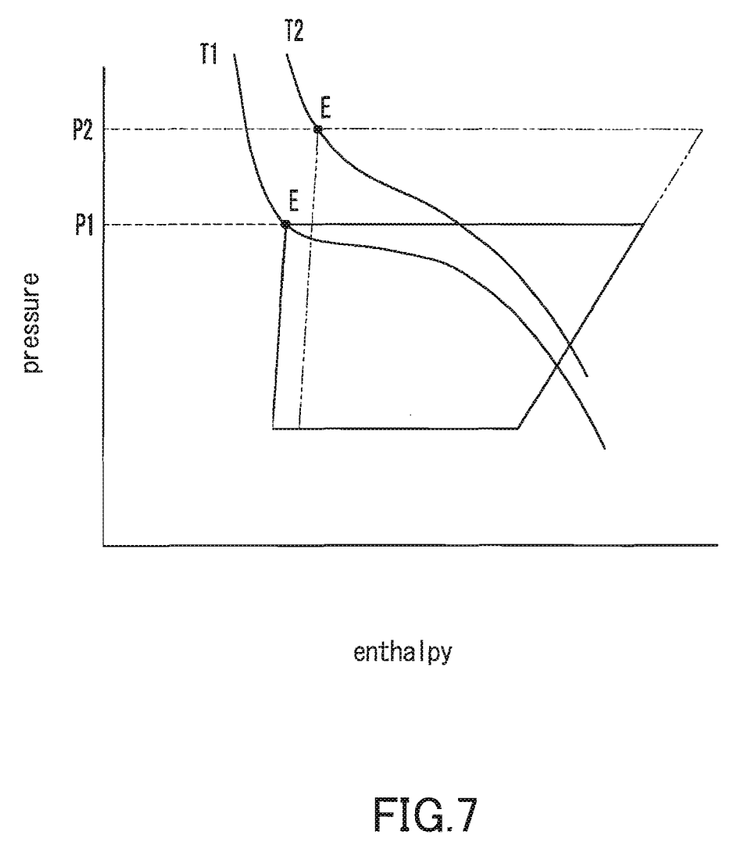
FIG. 7 is a Mollier diagram of a conventional refrigeration cycle apparatus.

As the temperature of the fluid in the low-temperature side flow passage 104b increases, the temperature of the refrigerant in the high-temperature side flow passage 104a must be increased accordingly. However, when the temperature of the refrigerant in the high-temperature side flow passage 104a is increased, the high-pressure-side pressure of the refrigerant circuit 101 rises. For example, as shown in FIG. 7, when the refrigerant temperature at the outlet (Point E) of the radiator 104 is increased from T1 to T2 (>T1), the high-pressure-side pressure of the refrigerant circuit 101 rises from P1 to P2. Precisely speaking, since the amount of the refrigerant filled in the apparatus is fixed, the high-pressure-side pressure of the refrigerant circuit 101 rises inevitably as the temperature of the fluid in the low-temperature side flow passage 104b increases. As a result, the input to the compressor 103 increases, thus causing a problem of a decrease in the COP of the refrigeration cycle apparatus 100.

Figure 8:
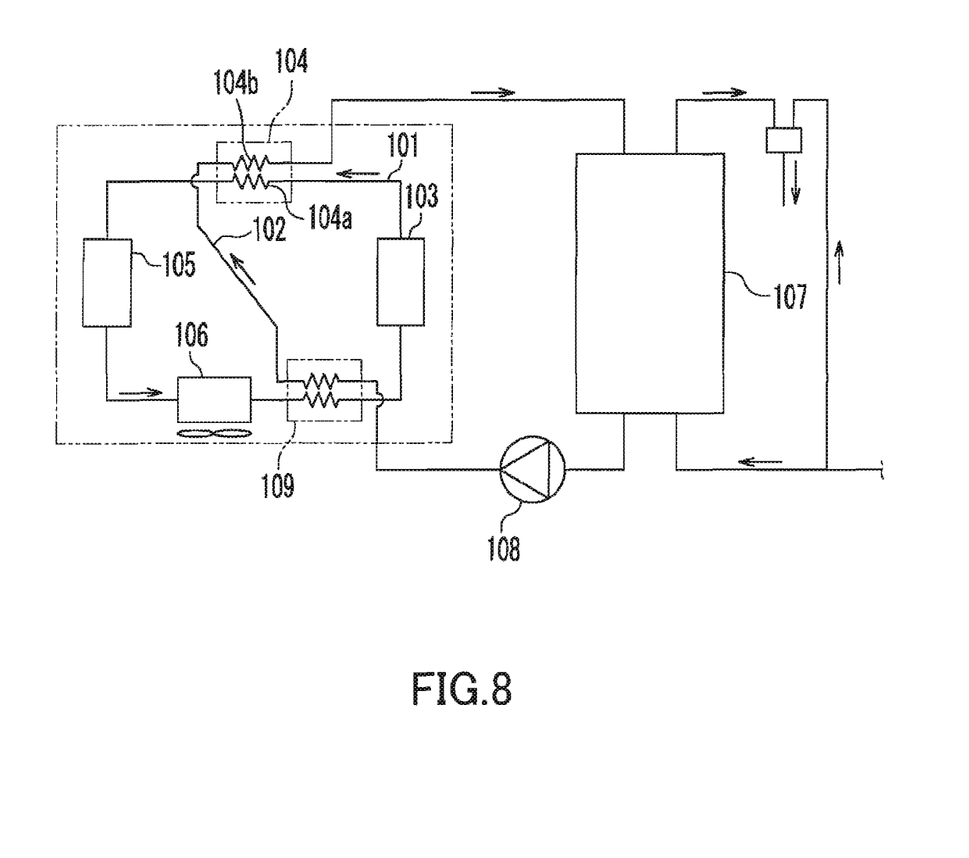
FIG. 8 is a configuration diagram of another conventional refrigeration cycle apparatus.

For this reason, it is conceived that the fluid to be flowed in the low-temperature side flow passage 104b of the radiator 104 is cooled before it flows into the low-temperature side flow passage 104b. JP 2002-98429 A proposes, as shown in FIG. 8, that a sub heat exchanger 109 is provided at the outlet side of the evaporator 106 of the refrigerant circuit 101, so that a fluid (water) is cooled by a refrigerant at the outlet side of the evaporator 106 of the refrigerant circuit 101 before the fluid flows into the low-temperature side flow passage 104b of the radiator 104. With this configuration, the temperature of the fluid in the low-temperature side flow passage 104b of the radiator 104 decreases, and thus the increase in the high-pressure-side pressure of the refrigerant circuit 101 is suppressed to some extent. As a result, the decrease in the COP of the refrigeration cycle apparatus 100 is suppressed to some extent.

DISCLOSURE OF INVENTION

In recent years, however, further enhancement of the COP of refrigeration cycle apparatuses has been desired to promote further energy conservation.

The present invention has been made in view of the above circumstances, and has an object to enhance further the COP of a refrigeration cycle apparatus including a refrigerant circuit and a fluid circuit through which a fluid to be heated by a refrigerant in the refrigerant circuit flows.

The refrigeration cycle apparatus according to the present invention includes: a main refrigerant circuit having a compressor provided with an injection portion, a radiator, a first expansion mechanism, a second expansion mechanism, and an evaporator, which are connected in a circuit in this order; an injection passage connecting the injection portion of the compressor to a portion of the main refrigerant circuit between the first expansion mechanism and the second expansion mechanism; a fluid circuit through which a fluid to be heated in the radiator by a refrigerant in the main refrigerant circuit flows; and a sub heat exchanger for cooling the fluid by exchanging heat between the refrigerant in the injection passage and the fluid to be heated in the radiator.

BEST MODE FOR CARRYING OUT THE INVENTION

First Embodiment

Configuration of Refrigeration Cycle Apparatus

Figure 1:
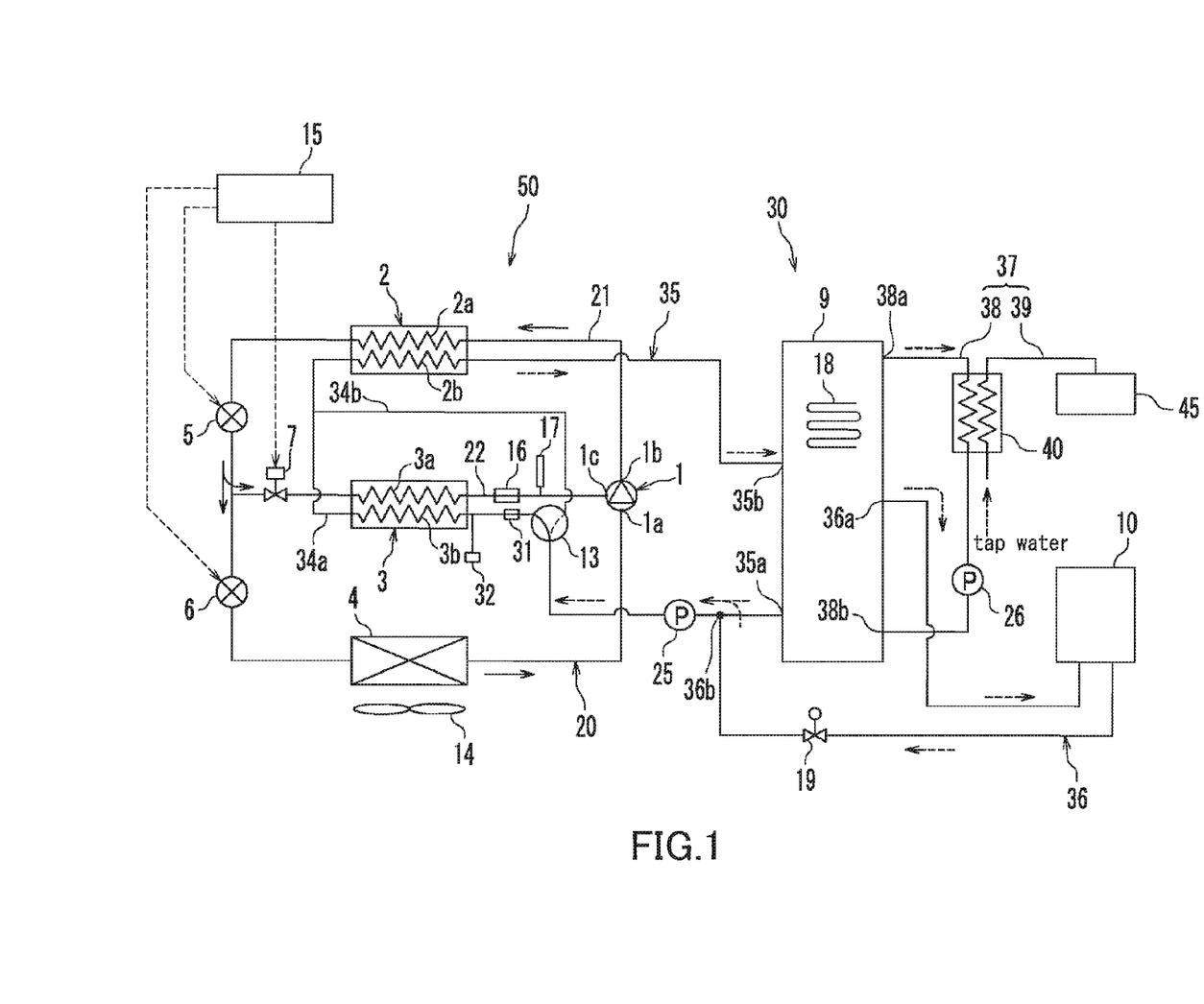
FIG. 1 is a configuration diagram of a refrigeration cycle apparatus according to a first embodiment.

As shown in FIG. 1, a refrigeration cycle apparatus 50 according to the first embodiment constitutes a multi-functional heat pump capable of performing water heating and space heating. The refrigeration cycle apparatus 50 includes a refrigerant circuit 20 and a water circuit 30 through which water to be used for water heating or space heating flows. The refrigerant circuit 20 serves as a heat source for heating the water in the water circuit 30.

The refrigerant circuit 20 includes a main refrigerant circuit 21 and an injection passage 22. The main refrigerant circuit 21 has a compressor 1, a radiator 2, a first expansion mechanism 5, a second expansion mechanism 6, and an evaporator 4. These components are connected in a circuit in this order, and thereby form the main refrigerant circuit 21. The refrigerant circuit 20 is filled with carbon dioxide as a refrigerant.

The compressor has a suction port 1a, a discharge port 1b, and an injection port 1c. The injection port 1c is provided as an injection portion for injecting the refrigerant from the injection passage 22 into a compression chamber. It should be noted, however, that the specific structure of the compressor 1 is not limited in any way. As the compressor 1, for example, a rotary compressor, a scroll compressor, or the like can be used suitably.

The radiator 2 is a so-called liquid-liquid heat exchanger, and includes a high-temperature side flow passage 2a and a low-temperature side flow passage 2b. As the radiator 2, for example, a double pipe heat exchanger, a plate heat exchanger, or the like can be used suitably.

As the first expansion mechanism 5 and the second expansion mechanism 6, for example, electric expansion valves or the like can be used suitably. It should be noted, however, that the specific structures of the first expansion mechanism 5 and the second expansion mechanism 6 are not limited in any way. The first expansion mechanism 5 and the second expansion mechanism 6 may be the same type of expansion mechanisms. They may differ from each other in their types. As an example, the first expansion mechanism 5 may be an electric expansion valve, and the second expansion mechanism 6 may be a capillary. Furthermore, at least one of the first expansion mechanism 5 and the second expansion mechanism 6 may be a positive displacement fluid machine capable of recovering mechanical power from a refrigerant.

The specific structure of the evaporator 4 also is not particularly limited, but it is a so-called air heat exchanger in the present embodiment. As the evaporator 4, for example, a plate fin tube heat exchanger or the like can be used suitably. The evaporator 4 is provided with an air blower 14. A liquid-liquid heat exchanger can, of course, be used as the evaporator 4.

The injection passage 22 connects the injection port 1c of the compressor 1 to a portion of the main refrigerant circuit 21 between the first expansion mechanism 5 and the second expansion mechanism 6. The injection passage 22 is provided with a flow rate regulator 7 for regulating the flow rate of the refrigerant. The structure of the flow rate regulator 7 is not limited in any way. As the flow rate regulator 7, for example, an opening-adjustable electric valve or the like can be used suitably. A sub heat exchanger 3 is disposed in the injection passage 22. The sub heat exchanger 3 is a liquid-liquid heat exchanger, and includes a low-temperature side flow passage 3a and a high-temperature side flow passage 3b. The specific structure of the sub heat exchanger 3 also is not limited in any way. As the sub heat exchanger 3, for example, a double pipe heat exchanger, a plate heat exchanger, or the like can be used suitably.

The refrigeration cycle apparatus 50 further includes a controller 15 for controlling the flow rate regulator 7 and one or both of the first expansion mechanism 5 and the second expansion mechanism 6. The controller 15 is, for example, a commercially available digital signal processor (DSP). The injection passage 22 is provided with a flow rate sensor 16 and a pressure sensor 17. The flow rate sensor 16 detects the flow rate of the refrigerant in the injection passage 22, and the pressure sensor 17 detects the pressure (intermediate pressure) of the refrigerant in the injection passage 22. The signals detected by the flow rate sensor 16 and the pressure sensor 17 are sent to the controller 15. A temperature sensor can be used in place of the pressure sensor 17 to detect the state (temperature and pressure) of the refrigerant in the injection passage 22. The flow rate sensor 16 may be eliminated.

The water circuit 30 includes a hot water storage tank 9, a heat source side water circuit 35, a space heating water circuit 36, and a hot water supply circuit 37.

The hot water storage tank 9 is a vertically elongated tank for storing water, and a so-called thermal stratification tank showing a temperature distribution in which a water temperature increases upward. It should be noted, however, that the structure of the hot water storage tank 9 is not particularly limited. A heater 18 is provided inside the hot water storage tank 9.

The heat source side water circuit 35 is a circuit for heating water by using the refrigerant circuit 20 as a heat source. The upstream end 35a of the heat source side water circuit 35 is connected to a lower portion of the hot water storage tank 9. Therefore, relatively low temperature water stored in the lower part of the hot water storage tank 9 is supplied from the hot water storage tank 9 to the heat source side water circuit 35. The downstream end 35b of the heat source side water circuit 35 is connected in the vicinity of a vertically central portion of the hot water storage tank 9. The heat source side water circuit 35 is provided with a pump 25, the high-temperature side flow passage 3b of the sub heat exchanger 3, and the low-temperature side flow passage 2b of the radiator 2, in this order. A flow passage switching valve 13 as a component of the heat source side water circuit 35 is provided between the pump 25 and the high-temperature side flow passage 3b of the sub heat exchanger 3.

The heat source side water circuit 35 includes a main passage 34a including the sub heat exchanger 3 and a bypass passage 34b that bypasses the sub heat exchanger 3. The bypass passage 34b branches off from the main passage 34a upstream of the sub heat exchanger 3, and merges with the main passage 34a between the outlet of the sub heat exchanger 3 and the inlet of the radiator 2. Specifically, one end of the bypass passage 34b is connected to the flow passage switching valve 13, and the other end thereof is connected to a portion between the sub heat exchanger 3 and the radiator 2. The heat source side water circuit 35 can be switched between a first state and a second state. In the first state, water is allowed to flow only through the main passage 34a, and in the second state, water is allowed to flow only through the bypass passage 34b. This switching between the first state and the second state can be performed by controlling the flow passage switching valve 13. The increase in pressure loss can be prevented by setting the second state in the case where the water to be heated in the radiator 2 need not be pre-cooled in the sub heat changer 3.

The space heating water circuit 36 is a circuit for heating space by using hot water stored in the hot water storage tank 9 as a heat source. The upstream end 36a of the space heating water circuit 36 is connected to the vertically central portion of the hot water storage tank 9. The downstream end 36b of the space heating water circuit 36 is connected to a portion of the heat source side water circuit 35 between the upstream end 35a thereof and the pump 25. As a result, the water in the space heating water circuit 36 merges, at the downstream end 36b thereof, with the water in the heat source side water circuit 35. The space heating water circuit 36 is provided with a radiator 10 as a space heating device. The radiator 10 (indoor radiator) is a heat exchanger for space heating. The hot water stored in the hot water storage tank 9 flows through the radiator 10, and thereby indoor heating can be performed. A valve 19 is provided between the radiator 10 and the downstream end 36b.

In this way, the space heating water circuit 36 is connected to the heat source side water circuit 35. Specifically, the downstream end 36b of the space heating water circuit 36 is connected to a portion of the heat source side water circuit 35 upstream of the sub heat exchanger 3 so that the water (return water) that has flowed from the indoor radiator 10 is heated in the radiator 2 after passing through the sub heat exchanger 3. The heat source side water circuit 35 is used to heat, in the radiator 2, the return water that has flowed from the indoor radiator 10 after the return water is cooled in the sub heat exchanger 3.

The hot water supply circuit 37 is a circuit for supplying hot water to a hot water supply device 45 by using the hot water stored in the hot water storage tank 9 as a heat source. The hot water supply circuit 37 includes a first circuit 38 serving as a heat source side circuit and a second circuit 39 serving as a use side circuit. The upstream end 38a of the first circuit 38 is connected to an upper portion of the hot water storage tank 9. The downstream end 38b of the first circuit 38 is connected to a lower portion of the hot water storage tank 9. The first circuit 38 is provided with a pump 26. The second circuit 39 is provided with the hot water supply device 45 for the use of hot water. The specific structure of the hot water supply device 45 is not limited in any way. The hot water supply device 45 can be used suitably for a shower, a kitchen, or the like, for example. The first circuit 38 and the second circuit 39 are connected to each other via a heat exchanger 40. As the heat exchanger 40, for example, a double pipe heat exchanger, a plate heat exchanger, or the like can be used. The water stored in the hot water storage tank 9 flows through the first circuit 38, and tap water is supplied to the second circuit 39. The tap water supplied to the second circuit 39 is heated in the heat exchanger 40 by the hot water in the first circuit 38, and supplied as hot water to the hot water supply device 45.

The heat source side water circuit 35 is provided with a flow rate sensor 31 and a temperature sensor 32. The flow rate sensor 31 detects the flow rate of the water in the sub heat exchanger 3, and the temperature sensor 32 detects the temperature of the water in the sub heat exchanger 3. The flow rate sensor 31 suffices as long as it can detect directly or indirectly the flow rate of the water in the high-temperature side flow passage 3b. The type and the arrangement position of the flow rate sensor 31 is not limited in any way. In the present embodiment, the flow rate sensor 31 is disposed between the flow passage switching valve 13 and the high-temperature side flow passage 3b. The temperature sensor 32 suffices as long as it can detect directly or indirectly the temperature of the water at the inlet of the sub heat exchanger 3. It should be noted that the flow rate sensor 31 may be eliminated and instead the flow rate of the heat source side water circuit 35 may be detected based on the rotational speed of the pump 25.

—Operation of Refrigeration Cycle Apparatus—

The refrigeration cycle apparatus 50 is capable of performing a water heating operation for supplying hot water to the hot water storage tank 9, a space heating operation for heating space by utilizing the radiator 10, and a hot water supply operation for supplying hot water to the hot water supply device 45 by using hot water stored in the hot water storage tank 9. These operations may be performed independently from one another, or may be performed simultaneously with other operations.

(Water Heating Operation)

First, the water heating operation will be described. In the refrigerant circuit 20, an injection operation for supplying an intermediate-pressure refrigerant to the compressor 1 through the injection passage 22, and a non-injection operation in which the refrigerant is not allowed to flow into the injection passage 22 can be performed selectively.

In the case where the water heating operation is not performed simultaneously with the space heating operation, water in the space heating water circuit 36 is not supplied to the refrigerant circuit 20 but water stored in the hot water storage tank 9 only is supplied thereto. Therefore, the temperature of the water supplied to the refrigerant circuit 20 is relatively low. Accordingly, even if the water is supplied to the low-temperature side flow passage 2b of the radiator 2 without cooling it previously, there is little possibility that the high-pressure-side pressure of the refrigerant circuit 20 (pressure in a path from the discharge side of the compressor 1 to the first expansion mechanism 5 through the radiator 2) could rise excessively. For this reason, in the present embodiment, in the case where the water heating operation is not performed simultaneously with the space heating operation, the refrigerant circuit 20 performs the non-injection operation.

On the other hand, in the case where the water heating operation is performed simultaneously with the space heating operation, water is supplied to the refrigerant circuit 20 not only from the hot water storage tank 9 but also from the radiator 10. However, the temperature of the water (hereinafter referred to as "return water") returning from the radiator 10 to the side of the refrigerant circuit 20 is relatively high. Therefore, if the return water is supplied to the low-temperature side flow passage 2b without taking any measures, the high-pressure-side pressure of the refrigerant circuit 20 rises, which may cause a significant decrease in the COP. For this reason, in the present embodiment, in the case where the water heating operation is performed simultaneously with the space heating operation, the refrigerant circuit 20 performs the injection operation.

In the case where only the water heating operation is performed, the valve 19 of the space heating water circuit 36 is closed. The flow passage switching valve 13 is set to a state shown in a broken line of FIG. 1 in order to allow the water to flow through the bypass passage 34b. In addition, for the non-injection operation to be performed, the flow rate regulator 7 is set to a fully closed state in order to cut off the circulation of the refrigerant. Specifically, the controller 15 performs a control of the flow rate regulator 7 and a control of the flow passage switching valve 13 by associating these controls with each other so that the water flows only through the bypass passage 34b when the flow rate of the refrigerant in the injection passage 22 is zero. These controls allow the passage length of the heat source side water circuit 35 to be shortened, which prevents an increase in pressure loss.

In the refrigerant circuit 20, the refrigerant discharged from the discharge port 1b of the compressor 1 flows through the high-temperature side flow passage 2a of the radiator 2 and radiates heat to the water in the low-temperature side flow passage 2b. After radiating heat, the refrigerant expands in the first expansion mechanism 5 and the second expansion mechanism 6, and as a result, the high-pressure refrigerant turns into a low pressure refrigerant. This low-pressure refrigerant is evaporated in the evaporator 4 and drawn into the compressor 1 through the suction port 1a.

In the water circuit 30, relatively low temperature water supplied from the lower part of the hot water storage tank 9 is delivered by the pump 25. The water discharged from the pump 25 passes through the bypass passage 34b and flows into the low-temperature side flow passage 2b of the radiator 2. In the radiator 2, the water in the low-temperature side flow passage 2b is heated by the refrigerant in the high-temperature side flow passage 2a, and as a result, the water turns into hot water. This hot water flows from the low-temperature side flow passage 2b of the radiator 2, and thereafter is delivered back to the vicinity of the vertically central portion of the hot water storage tank 9.

It should be noted, however, that the water heating operation may be performed simultaneously with the injection operation. Specifically, the heat source side water circuit 35 may be used to return the water stored in the lower part of the hot water storage tank 9 to the tank 9 again after the water is cooled in the sub heat exchanger 3 and heated in the radiator 2. Cooling the water in the sub heat exchanger 3 is of significance particularly when the temperature of the water stored in the lower part of the hot water storage tank 9 is relatively high.

(Space Heating Operation)

Next, the space heating operation will be described. It is possible to perform the space heating operation alone while stopping the operation of the refrigerant circuit 20, but the case where the water heating operation and the space heating operation are performed simultaneously will be described hereinafter. As described above, in the case where the water heating operation is performed simultaneously with the space heating operation, the injection operation is performed in the refrigerant circuit 20. Therefore, the flow rate regulator 7 of the injection passage 22 is set to an opened state.

In this space heating operation, the high-pressure refrigerant (see Point D in FIG. 2) discharged from the discharge port 1b of the compressor 1 flows through the high-temperature side flow passage 2a of the radiator 2 and radiates heat to the water in the low-temperature side flow passage 2b. The refrigerant that has radiated heat (see Point E in FIG. 2) expands in the first expansion mechanism 5, and turns into an intermediate-pressure gas-liquid two phase or liquid phase refrigerant (see Point F in FIG. 2).

Figure 2:
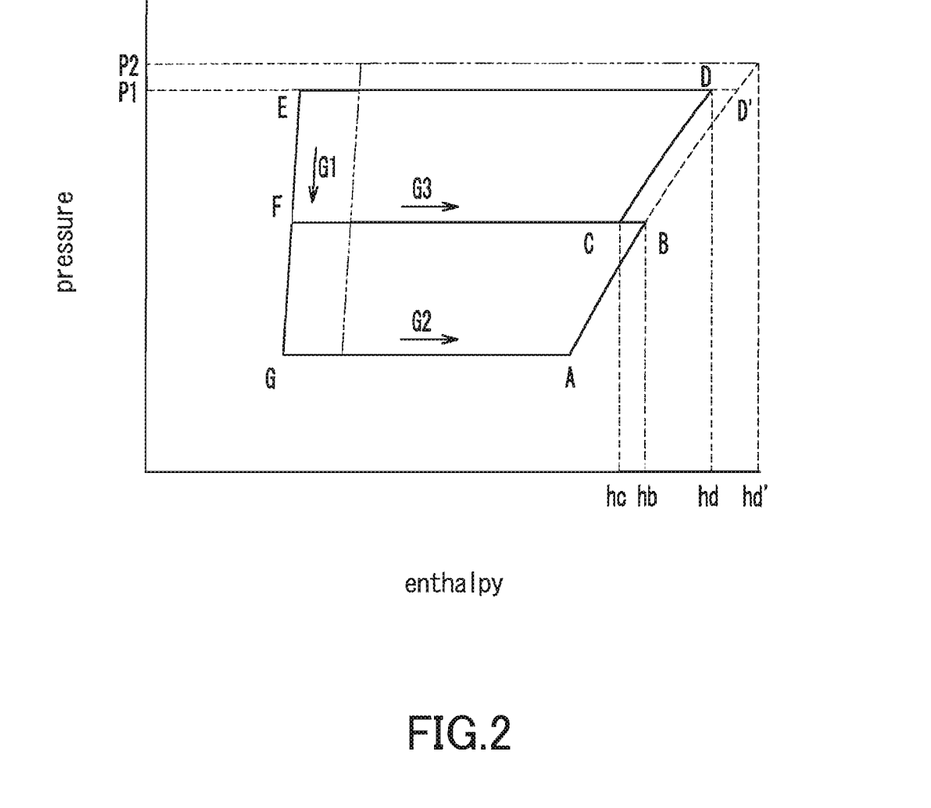
FIG. 2 is a Mollier diagram showing operation of the refrigeration cycle apparatus according to the first embodiment.

The intermediate-pressure refrigerant branches off, and a portion of the refrigerant expands further in the second expansion mechanism 6 and turns into a low-pressure refrigerant (see Point G in FIG. 2). The other portion of the refrigerant flows into the injection passage 22.

The low-pressure refrigerant is evaporated in the evaporator 4 and thereafter drawn into the compressor 1 through the suction port 1a (see Point A in FIG. 2).

The intermediate-pressure refrigerant that has flowed into the injection passage 22 (refrigerant including liquid as a portion thereof) flows through the low-temperature side flow passage 3a of the sub heat exchanger 3. This refrigerant exchanges heat with the water in the high-temperature side flow passage 3b, and thereby it cools the water while it is heated. At this time, the liquid refrigerant is evaporated. The gasified intermediate-pressure refrigerant is drawn into the compressor 1 through the injection port 1c. After this intermediate-pressure refrigerant is drawn from the suction port 1a, it merges (see Point C in FIG. 2) with the refrigerant whose pressure is raised to an intermediate level (see Point B in FIG. 2), and further is compressed to a high pressure (see Point D in FIG. 2). Thereafter, the compressed high-pressure refrigerant is discharged from the discharge port 1b, and the above-mentioned operation is repeated.

In the space-heating water circuit 36, the valve 19 is opened. The hot water supplied from the hot water storage tank 9 flows into the radiator 10, and heats the indoor air through the radiator 10. Thereby, indoor heating is performed. The water that has flowed from the radiator 10 flows into the heat source side water circuit 35 from the downstream end 36b of the space heating water circuit 36.

In the heat source side water circuit 35, the flow passage switching valve 13 is set to a state shown in a solid line of FIG. 1 so that the water delivered from the pump 25 is supplied to the high-temperature side flow passage 3b of the sub heat exchanger 3. In this state, the return water from the radiator 10 flows into the heat source side water circuit 35 from the downstream end 36b of the space heating water circuit 36, passes through the pump 25, and then flows into the high-temperature side flow passage 3b of the sub heat exchanger 3. The water in the high-temperature side flow passage 3b is cooled by the refrigerant in the low-temperature side flow passage 3a. The water thus cooled flows from the high-temperature side flow passage 3b, and thereafter flows into the low-temperature side flow passage 2b of the radiator 2. The water that has flowed into the low-temperature side flow passage 2b is heated by the refrigerant in the high-temperature side flow passage 2a, and as a result, it flows from the low-temperature side flow passage 2b as high-temperature water. The high-temperature water that has flowed from the low-temperature side flow passage 2b is delivered back to the hot water storage tank 9.

During the space heating operation, the controller 15 controls the flow rate regulator 7 and at least one selected from the first expansion mechanism 5 and the second expansion mechanism 6 based on the flow rate and temperature of the water in the sub heat exchanger 3. Specifically, the controller 15 performs the control to maximize the COP under the operational conditions under which the radiator 2 or the evaporator 4 is able to show the required performance. More specifically, the controller 15 controls the first expansion mechanism 5 and/or the second expansion mechanism 6, and thereby adjusts the intermediate pressure of the refrigerant circuit 20 to maximize the COP. On the other hand, the controller 15 controls the flow rate regulator 7, and thereby adjusts the injection rate (flow rate of the refrigerant drawn from the injection port 1c of the compressor 1) to maximize the COP.

The intermediate pressure of the refrigerant circuit 20 is determined based on, for example, the temperature of the refrigerant discharged from the compressor 1 and the temperature of the incoming water into the sub heat exchanger 3. The intermediate pressures at which the COP is maximized under various combinations of these temperatures are obtained previously through experiments and simulations, and stored in a database. Having the prepared database, the controller 15 can determine the optimum intermediate pressure promptly according to the combinations of the discharged refrigerant temperature and the incoming water temperature. It should be noted that the intermediate pressure can be detected by the sensor 17.

It is preferable to reduce the high-pressure-side pressure of the refrigerant circuit 20 in order to enhance the COP. Therefore, it is preferable to lower the temperature of the water in the low-temperature side flow passage 2b of the radiator 2 as much as possible. For this reason, in the present embodiment, the amount of heat to be exchanged in the sub heat exchanger 3 is increased so as to cool the return water as much as possible in the sub heat exchanger 3.

Furthermore, it is preferable to increase the amount of refrigerant injected into the compressor 1 as much as possible in order to enhance the COP. Therefore, it is preferable to increase the flow rate of the refrigerant in the injection passage 22 as much as possible. In the present embodiment, the sub heat exchanger 3 is provided in the injection passage 22, and thereby the refrigerant is heated in the sub heat exchanger 3. Accordingly, even if the intermediate-pressure refrigerant in the injection passage 22 includes a liquid refrigerant as a portion thereof, the liquid refrigerant is evaporated in the sub heat exchanger 3 and injected into the compressor 1 as a gas refrigerant. Furthermore, the case where the refrigerant in the injection passage 22 includes a liquid refrigerant as a portion thereof is more preferable than the case where all the refrigerant is a gas refrigerant, because a larger amount of return water is cooled in the sub heat exchanger 3 in the former case. However, when the flow rate of the refrigerant in the injection passage 22 is excessively high, the liquid refrigerant may not be evaporated completely in the sub heat exchanger 3 depending on the temperature or the flow rate of the return water. As a result, the remaining liquid refrigerant may be drawn into the injection port 1c of the compressor 1.

Thus, it is preferable to allow as much refrigerant as possible to flow through the low-temperature side flow passage 3a of the sub heat exchanger 3, as long as the liquid refrigerant is evaporated completely. For this reason, in the present embodiment, the flow rate regulator 7 is controlled so that the liquid refrigerant that has flowed into the low-temperature side flow passage 3a of the sub heat exchanger 3 is evaporated completely and the flow rate of the refrigerant in the low-temperature side flow passage 3a is increased as much as possible. Specifically, the controller 15 controls the flow rate regulator 7 based on the flow rate and temperature of the water in the sub heat exchanger 3. The flow rate regulator 7 is controlled so that the flow rate (mass flow rate) of the refrigerant to be guided into the injection port 1c through the injection passage 22 is increased to the maximum extent to which the liquid refrigerant can be avoided from being guided into the injection port 1c.

As an example, the flow rates of the refrigerants in the injection passage 22 at which the COP is maximized under various combinations of the flow rates and temperatures of the water in the sub heat exchanger 3 are obtained previously through experiments and simulations, and stored in a database. Having the prepared database, the controller 15 can determine the optimum injection amount (flow rate of the refrigerant in the injection passage 22) promptly according to the combinations of the flow rates and temperatures of the water in the sub heat exchanger 3.

For example, when the flow rate of the water in the high-temperature side flow passage 3b of the sub heat exchanger 3 is high, the amount of heat to be exchanged in the sub heat exchanger 3 can be increased. Therefore, the flow rate regulator 7 is controlled to increase the flow rate of the refrigerant in the low-temperature side flow passage 3a. When the temperature of the water in the high-temperature side flow passage 3b of the sub heat exchanger 3 is high, the amount of heat to be exchanged in the sub heat exchanger 3 can be increased. Therefore, the flow rate regulator 7 is controlled to increase the flow rate of the refrigerant in the low-temperature side flow passage 3a.

Thus, in the present embodiment, the purpose of the control is to evaporate completely the liquid refrigerant that has flowed into the low-temperature side flow passage 3a of the sub heat exchanger 3 and to maximize the flow rate of the refrigerant in the low-temperature side flow passage 3a. The first expansion mechanism 5 and/or the second expansion mechanism 6 as well as the flow rate regulator 7 are controlled so that the refrigerant turns into a 100% saturated gas or is superheated slightly near the end of the injection passage 22 (outlet of the sub heat exchanger 3). Even if the liquid refrigerant is injected into the compressor 1, it has little influence on the efficiency and reliability of the compressor 1 if it is a small amount.

In the present embodiment, the sensor 17 is provided between the outlet of the sub heat exchanger 3 and the injection port 1c of the compressor 1. The temperature of the refrigerant in this section can be monitored by the sensor 17. The state of the refrigerant in this section can be estimated based on the detection result of the sensor 17, the temperature of the refrigerant to be drawn into the compressor 1 and the temperature of the refrigerant discharged from the compressor 1. Compensation control may be performed based on this estimation result. For example, when the degree of superheat of the refrigerant in this section is excessively high, the control of the flow rate regulator 7 is compensated to increase the flow rate of the refrigerant in the injection passage 22. On the other hand, when the refrigerant in this section includes a liquid-phase refrigerant, the control of the flow rate regulator 7 is compensated to decrease the flow rate of the refrigerant in the injection passage 22. Thereby, a maximum amount of refrigerant in a nearly saturated gas state can be injected into the compressor 1, which contributes to the optimization of the COP.

When the control of the flow rate regulator 7 is performed based on the flow rate and temperature of the water in the high-temperature side flow passage 3b of the sub heat exchanger 3, the purpose of the control is not limited to the above-mentioned one. The control can be performed for other various purposes.

(Hot Water Supply Operation)

Next, the hot water supply operation will be described. During the hot water supply operation, the pump 26 of the hot water supply circuit 37 is driven and thereby the high temperature water stored in the upper part of the hot water storage tank 9 flows into the first circuit 38 of the hot water supply circuit 37. On the other hand, tap water is supplied to the second circuit 39 of the hot water supply circuit 37. The high-temperature water in the first circuit 38 and the tap water in the second circuit 39 undergo heat exchange via the heat exchanger 40. As a result, the tap water is heated to a high temperature and supplied to the hot water supply device 45. On the other hand, the high-temperature water in the first circuit 38 is cooled by the tap water via the heat exchanger 40 and returned to the lower part of the hot water storage tank 9.

In such a case where the temperature of the water stored in the hot water storage tank 9 drops during any of the above-mentioned water heating operation, space heating operation and hot water supply operation, the water temperature can be raised by heating the water stored in the hot water storage tank 9 by the heater 18.

Advantageous Effects of Present Embodiment

As described above, the refrigeration cycle apparatus 50 according to the present embodiment includes the injection passage 22 for allowing the intermediate-pressure refrigerant to be injected to the compressor 1, and the sub heat exchanger 3 for cooling the water to be heated in the radiator 2, by the refrigerant in the injection passage 22. Accordingly, in an effort to enhance the COP, it is possible to obtain not only the effect of injection and the effect of cooling previously the water to be heated in the radiator 2 (hereinafter referred to as a "pre-cooling effect"), but also the synergistic effect of these effects, as described below.

First, according to the refrigeration cycle apparatus 50 of the present embodiment, the injection effect can be obtained. Specifically, in the refrigeration cycle apparatus 50 of the present embodiment, a portion of the refrigerant that has flowed from the high-temperature side flow passage 2a of the radiator 2 flows through the injection passage 22. Therefore, the amount of refrigerant in the evaporator 4 is decreased by the amount of refrigerant in the injection passage 22, and the amount of refrigerant drawn from the suction port 1a of the compressor 1 is decreased accordingly. Thus, the work load of the compressor 1 for compression from a low pressure to an intermediate pressure can be reduced. As shown in FIG. 2, when the mass flow rate of the refrigerant that has flowed from the high-temperature side flow passage 2a of the radiator 2 (see Point E to Point F) is denoted as G1, and the mass flow rate of the refrigerant in the injection passage 22 (see Point F to Point C) is G3, the mass flow rate G2 of the refrigerant in the evaporator 4 (see Point G to Point A) is calculated by subtracting G3 from G1. That is, G2 is smaller than G1. Therefore, the amount of refrigerant changing its state from the Point A state to the Point B state is decreased, and thus the compression work load of the compressor 1 can be reduced. As a result, the input to (power consumption) the compressor 1 can be reduced.

In the case where the injection passage 22 is not provided, the refrigerant compressed in the compressor 1 changes its state from the Point A state to Point D' state. In contrast, in the present embodiment provided with the injection passage 22, the intermediate-pressure refrigerant is, before it is compressed in the compressor 1, a mixture of the refrigerant (refrigerant that has changed its state from Point B to Point C in FIG. 2) whose pressure has been raised from a low pressure to an intermediate pressure in the compressor 1 and the intermediate-pressure refrigerant (refrigerant that has changed its state from Point F to Point C in FIG. 2) introduced through the injection port 1c. As a result, the point representing the state of the intermediate-pressure refrigerant before compression is not Point B but Point C. Then, the intermediate-pressure refrigerant is compressed in the compressor 1 and changes its state from Point C to Point D. Accordingly, without the injection passage 22, the work load required for the compressor 1 to compress the intermediate-pressure refrigerant to a high pressure refrigerant corresponds to an enthalpy difference $\Delta'=hd'-hb$. In contrast, in the present embodiment, the work load required for the compressor 1 corresponds to an enthalpy difference $\Delta=hd-hc$. Here, $\Delta'$ is larger than $\Delta$ based on the facts that the pressure of the refrigerant is raised in the compressor 1 along the isentropic line and that the slope of the isentropic line at a low enthalpy side is larger than that at a high enthalpy side. Accordingly, the present embodiment provided with the injection passage 22 makes it possible to reduce the input to the compressor 1 even when the intermediate-pressure refrigerant is compressed to a high pressure refrigerant.

Furthermore, according to the present embodiment, the following pre-cooling effect can be obtained. The present embodiment makes it possible to cool the water in the sub heat exchanger 3 by the refrigerant in the injection passage 22 before the water flows into the low-temperature side flow passage 2b of the radiator 2. Thus, the temperature of the water in the low-temperature side flow passage 2b of the radiator 2 can be reduced, and as a result, the temperature of the refrigerant in the high-temperature side flow passage 2a of the radiator 2 can be reduced. Accordingly, a rise in the high-pressure-side pressure of the refrigerant can be suppressed, and thus the input to the compressor 1 can be reduced. For example, as shown in FIG. 2, the presence of the sub heat exchanger 3 allows the high-pressure-side pressure to drop from P2 to P1, and thus the input to the compressor 1 can be reduced accordingly.

The above-mentioned injection effect and pre-cooling effect also can be obtained by adding an injection passage to a conventional refrigeration cycle apparatus (see, for example, FIG. 8) provided with a sub heat exchanger at the outlet side of an evaporator in a refrigerant circuit. The temperature of the refrigerant at the outlet of the evaporator is lower than that in the injection passage. Therefore, it is believed that the above-mentioned pre-cooling effect is enhanced by providing the sub heat exchanger at the outlet side of the evaporator. It seems to be possible to raise the low-pressure-side pressure of the refrigerant and enhance the COP further by providing the sub heat exchanger at the outlet side of the evaporator.

It is true that in the case where the sub heat exchanger is provided at the outlet side of the evaporator, the water is cooled to a lower temperature before it flows into the radiator. Therefore, the pre-cooling effect itself is enhanced. However, an increase in the COP by this increase of the pre-cooling effect is not so significant. Moreover, the low-pressure-side pressure of the refrigerant in the refrigerant circuit depends mainly on the temperature of the fluid to be cooled (air in the present embodiment) in the evaporator. Therefore, even if the sub heat exchanger is provided at the outlet side of the evaporator, the low-pressure-side pressure of the refrigerant does not rise significantly nor is the COP enhanced significantly, compared with the case where the sub heat exchanger is provided in the injection passage.

In the conventional refrigeration cycle apparatus provided with the injection passage, in order to avoid the return of the liquid to the compressor, a gas-liquid separator is provided upstream of the injection passage so that only the gas separated from the liquid is supplied to the injection passage. In contrast, according to the present embodiment, since the sub heat exchanger 3 is provided in the injection passage 22, the liquid refrigerant is evaporated in the sub heat exchanger 3 even if it is included in the refrigerant in the injection passage 22. Therefore, the liquid refrigerant that has flowed into the injection passage 22 and remains in a liquid state is never drawn into the injection port 1c of the compressor 1. As a result, the liquid refrigerant is allowed to flow through the injection passage 22, and thus the mass flow rate (hereinafter referred to as an "injection rate") of the refrigerant in the injection passage 22 can be increased.

This increase in the injection rate enhances the above-mentioned injection effect and pre-cooling effect synergistically. Therefore, according to the present embodiment, not only both the injection effect and the pre-cooling effect but also the synergistic effect of these effects can be obtained, unlike a refrigeration cycle apparatus for obtaining these effects separately (that is, a refrigeration cycle apparatus obtained by simply adding an injection passage to a conventional refrigeration cycle apparatus provided with a sub heat exchanger at the outlet side of an evaporator). Accordingly, the present embodiment allows the above-mentioned advantageous effects to be combined and exerted as a synergistic effect, and thus the COP to be enhanced further.

Furthermore, according to the present embodiment, the controller 15 controls the flow rate regulator 7 and either one or both of the first expansion mechanism 5 and the second expansion mechanism 6 so as to maximize the COP under the operational conditions under which the radiator 2 or the evaporator 4 is able to show the required performance. Specifically, the controller 15 controls the flow rate regulator 7 and either one or both of the first expansion mechanism 5 and the second expansion mechanism 6 based on the flow rate and temperature of the water in the sub heat exchanger 3. Therefore, according to the present embodiment, the COP can be enhanced stably.

Furthermore, in the present embodiment, the controller 15 controls the flow rate regulator 7 based on the flow rate and temperature of the water in the sub heat exchanger 3. Therefore, it is possible to allow as much refrigerant as possible to flow through the injection passage 22 while preventing the liquid refrigerant from being drawn into the injection port 1c of the compressor 1. Thus, the COP can be enhanced further.

In the present embodiment, the refrigerant of the refrigerant circuit 20 is carbon dioxide, which is in a supercritical state on the high-pressure side. Such a refrigeration cycle apparatus is characterized in that the high-pressure-side pressure of the refrigerant circuit 20 is high intrinsically. However, in the present embodiment, the increase in the high-pressure-side pressure can be suppressed, as described above. Thus, the COP can be enhanced significantly.

The refrigeration cycle apparatus 50 according to the present embodiment constitutes a multi-functional heat pump capable of performing water heating and space heating. In the present embodiment, the temperature of the return water returning to the refrigerant circuit 20 side varies greatly depending on whether or not the space heating operation is performed, and the temperature of the return water is high during the space heating operation. According to the present embodiment, however, the COP can be enhanced even if the temperature of the return water is high, as described above. Thus, the space heating operation can be performed efficiently.

The load of the water heating or space heating operation varies according to seasons. As described above, according to the refrigeration cycle apparatus 50 of the present embodiment, a substantial decrease in the COP can be suppressed even if the temperature of the return water returning to the refrigerant circuit 20 side is high. Accordingly, the seasonal variations in the performance can be controlled, and thus high COP operation can be performed through the year.

Second Embodiment

Figure 3:
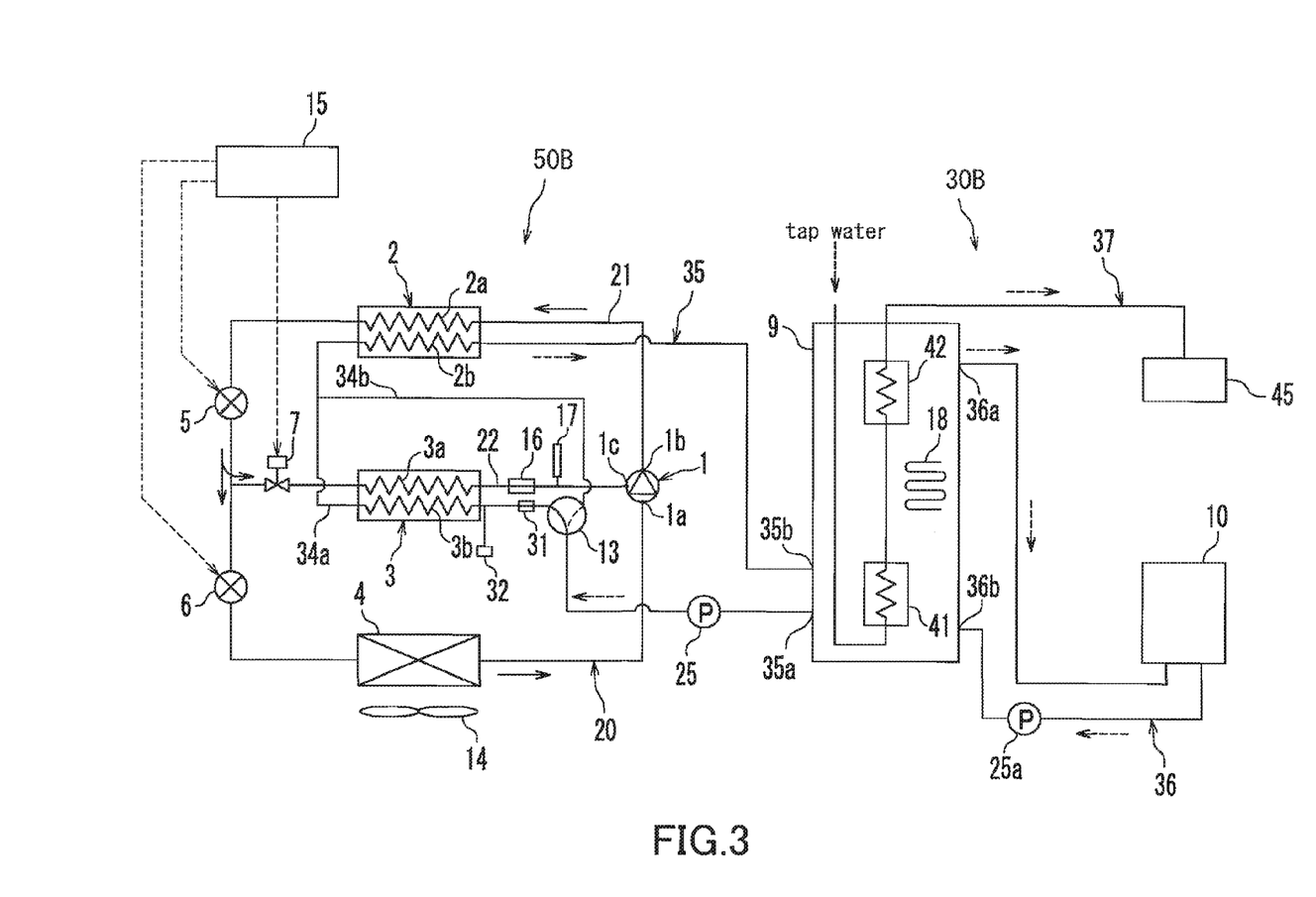
FIG. 3 is a configuration diagram of a refrigeration cycle apparatus according to a second embodiment.

As shown in FIG. 3, a refrigeration cycle apparatus 50B according to the second embodiment includes the refrigerant circuit 20 and a water circuit 30B. The water circuit 30B is a modified circuit of the water circuit 30 of the first embodiment. The structure of the refrigerant circuit 20 is the same as that of the first embodiment. Hereinafter, the same parts as those in the first embodiment are designated by the same reference numerals and no further description is given.

In the second embodiment, the downstream end 35b of the heat source side water circuit 35 is connected to a lower portion of the hot water storage tank 9. The structure of the heat source side water circuit 35 is the same as that of the first embodiment.

The upstream end 36a of the space heating water circuit 36 is connected to an upper portion of the hot water storage tank 9. The downstream end 36b of the space heating water circuit 36 is connected to a lower portion of the hot water storage tank 9. The space heating water circuit 36 is provided with the radiator 10 and a pump 25a. This configuration allows the high-temperature water stored in the upper part of the hot water storage tank 9 to be supplied to the radiator 10 and the water whose temperature is reduced in the radiator 10 to be returned to the lower part of the hot water storage tank 9.

In the present embodiment, a lower heat exchanger 41 and an upper heat exchanger 42 are provided, in addition to the heater 18, in the hot water storage tank 9. The lower heat exchanger 41 is disposed in the lower part of the hot water storage tank 9, and the upper heat exchanger 42 is disposed in the upper part of the hot water storage tank 9.

In the hot water supply circuit 37, the lower heat exchanger 41, the upper heat exchanger 42 and the hot water supply device 45 are connected in this order. In the hot water storage tank 9, a temperature distribution in which a water temperature increases upward is formed. Therefore, relatively low-temperature water is stored in the lower part of the hot water storage tank 9, and relatively high-temperature water is stored in the upper part of the hot water storage tank 9. Tap water supplied to the hot water supply circuit 37 is heated by the relatively low-temperature water during flowing through the lower heat exchanger 41, and thereafter, the tap water is heated further by the relatively high-temperature water during flowing through the upper heat exchanger 42. Thus, it turns into high-temperature water. This high-temperature water is supplied to the hot water supply device 45.

The heat source side water circuit 35 can be used to return the water stored in the lower part of the hot water storage tank 9 to the tank 9 again after the water is cooled in the sub heat exchanger 3 and further heated in the radiator 2. For example, when the temperature of the water stored in the lower part of the hot water storage tank 9 is relatively high, the water is heated in the radiator 2 after it is cooled in the sub heat exchanger 3. On the contrary, when the temperature of the water stored in the lower part of the hot water storage tank 9 is sufficiently low, the water is guided directly to the radiator 2 through the bypass passage 34b.

The same advantageous effects can be obtained in the present embodiment as in the first embodiment.

Third Embodiment

Figure 4:
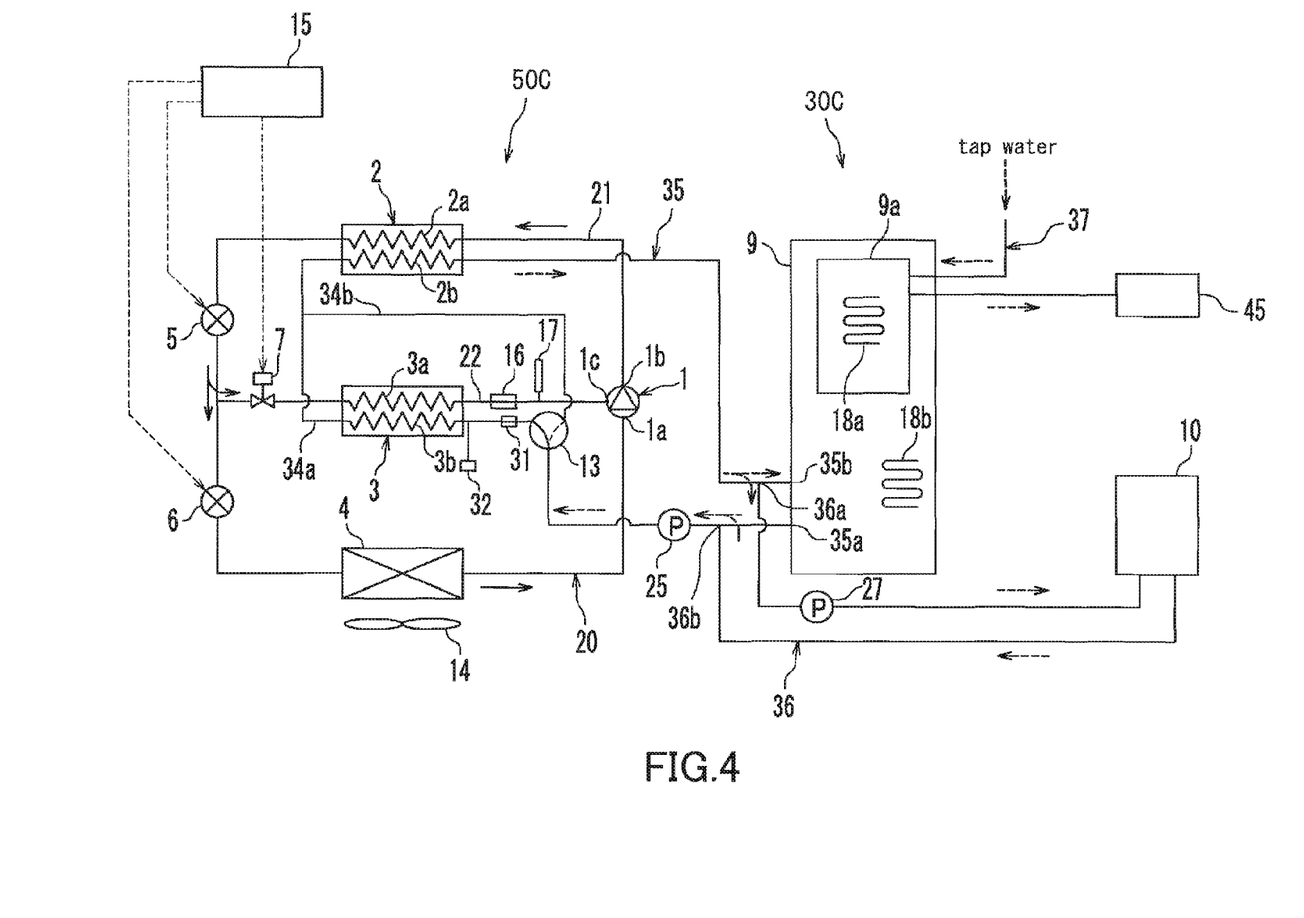
FIG. 4 is a configuration diagram of a refrigeration cycle apparatus according to a third embodiment.

As shown in FIG. 4, a refrigeration cycle apparatus 50C according to the third embodiment includes the refrigerant circuit 20 and a water circuit 30C. The water circuit 30C is a modified circuit of the water circuit 30 of the first embodiment. The structure of the refrigerant circuit 20 is the same as that of the first embodiment. Hereinafter, the same parts as those in the first embodiment are designated by the same reference numerals and no further description is given.

The structure of the heat source side water circuit 35 is the same as that of the first embodiment.

The upstream end 36a of the space heating water circuit 36 is connected to a portion near the downstream end 35b of the heat source side water circuit 35. The downstream end 36b of the space heating water circuit 36 is connected to a portion of the heat source side water circuit 35 between the upstream end 35a thereof and the pump 25. The radiator 10 is provided in the space heating water circuit 36. In the present embodiment, a portion of the hot water in the heat source side water circuit 35 branches off and is returned to the hot water storage tank 9, and the other portion of the hot water is supplied to the space heating water circuit 36. The hot water supplied to the space heating water circuit 36 flows through the radiator 10 and heats indoor air. The water that has flowed from the radiator 10 flows into the heat source side water circuit 35 from the downstream end 36b, and merges with the water supplied to the heat source side water circuit 35 from the hot water storage tank 9. It should be noted that a pump 27 may be provided in the space heating water circuit 36 in order to supply hot water to the radiator 10.

In the present embodiment, an inner tank 9a is provided in the hot water storage tank 9. In other words, the refrigeration cycle apparatus 50 according to the present embodiment includes a double tank. Water stored in the inner tank 9a has a higher temperature than that of water stored in the outer hot water storage tank 9. A heater 18a is disposed in the inner tank 9a, and a heater 18b is disposed outside the inner tank 9a but inside the hot water storage tank 9.

In the hot water supply circuit 37, the inner tank 9a and the hot water supply device 45 are connected in this order. Tap water supplied to the hot water supply circuit 37 flows into the inner tank 9a temporarily. The hot water stored in the inner tank 9a is heated by the hot water stored in the hot water storage tank 9 or heated by the heater 18a, and is supplied to the hot water supply device 45 as high-temperature water.

The same advantageous effects can be obtained in the present embodiment as in the first embodiment.

Modification

In the above-described embodiments, the "fluid" is water. However, the "fluid" of the present invention is not limited to water, and it may be other fluids such as brine (typically, an anti-freezing agent).

In the above-described embodiments, the refrigerant in the refrigerant circuit 20 is carbon dioxide. However, the "refrigerant" of the present invention is not limited to carbon dioxide, and it may be other refrigerants such as fluorocarbon-based refrigerants.

The "heat exchanger for space heating" of the present invention is not limited to the radiator 10. Space heating here includes so-called floor heating and the like.

Figure 5:
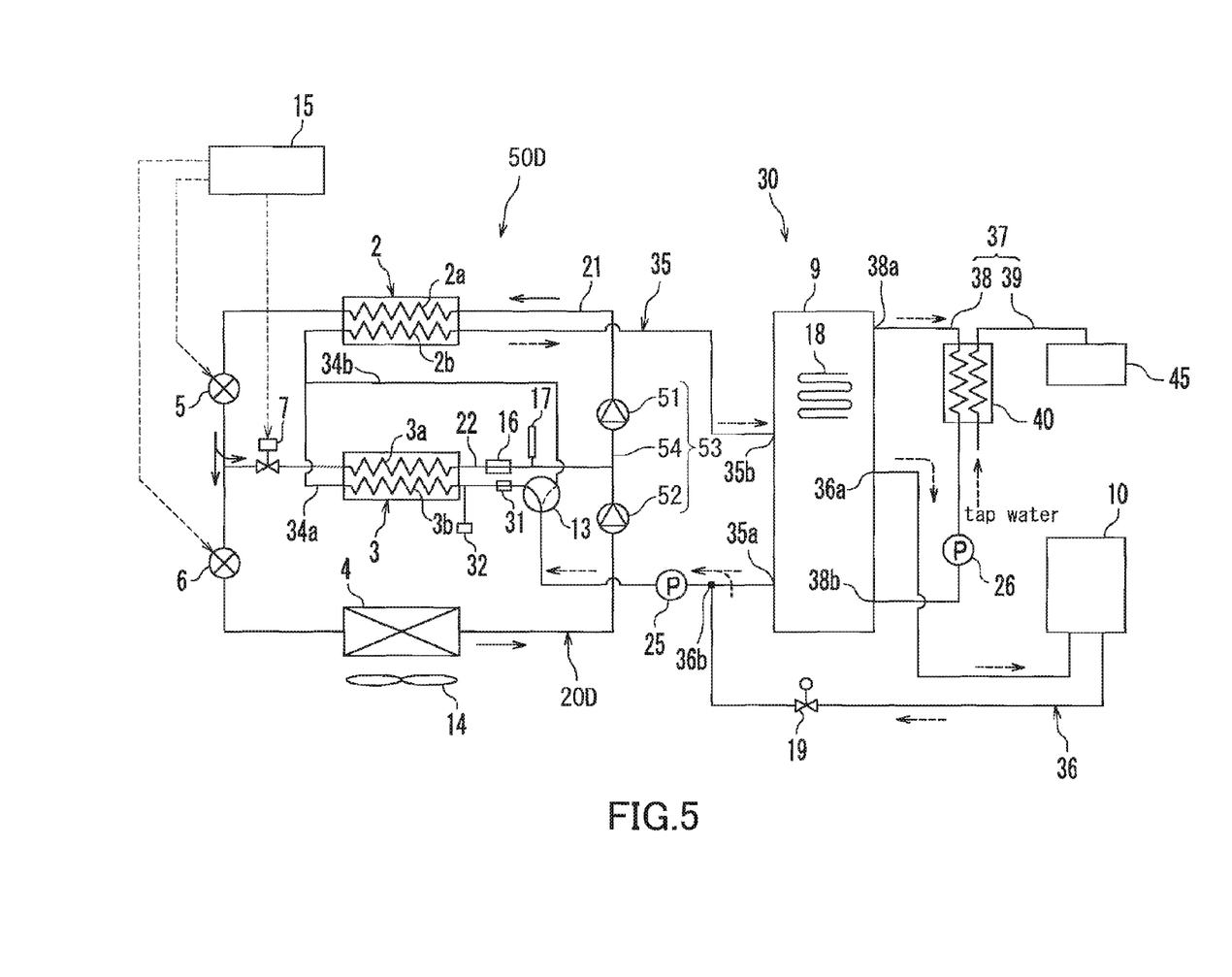
FIG. 5 is a configuration diagram of a modification of a refrigeration cycle apparatus.

In each of the embodiments, a compressor having no injection port may be used in place of the compressor 1 having the injection port 1c. A refrigeration cycle apparatus 50D shown in FIG. 5 includes a refrigerant circuit 20D having a multi-stage compressor 53. The multi-stage compressor 53 includes a low-pressure compression mechanism 52, a high-pressure compression mechanism 51, and a flow passage 54 connecting an outlet (discharge port) of the low-pressure compression mechanism 52 and an inlet (suction port) of the high-pressure compression mechanism 51. The flow passage 54 (typically, a pipe) is used as an injection portion into which the refrigerant is guided from the injection passage 22. The refrigeration cycle apparatus 50D can provide the same advantageous effects as in the first embodiment, although it differs from the first embodiment only in that a multi-stage compressor is used.

INDUSTRIAL APPLICABILITY

As described above, the present invention is useful for a refrigeration cycle apparatus such as a multi-functional heat pump.

The invention claimed is:

1. A refrigeration cycle apparatus comprising:
a main refrigerant circuit having a compressor provided with an injection portion, a radiator that heats fluid, a first expansion mechanism, a second expansion mechanism, and an evaporator, which are connected in a circuit in this order;
an injection passage connecting the injection portion of the compressor to a portion of the main refrigerant circuit between the first expansion mechanism and the second expansion mechanism;
a fluid circuit through which the fluid, which is heated in the radiator by a refrigerant in the main refrigerant circuit, flows; and
a sub heat exchanger that is a liquid-liquid heat exchanger, which comprises a low-temperature side flow passage and a high-temperature side flow passage, cools the fluid flowing in the high-temperature side flow passage, and heats the refrigerant flowing in the low-temperature side flow passage by exchanging heat between the refrigerant and the fluid before the fluid is heated in the radiator,
wherein the sub heat exchanger is disposed in the injection passage,
a flow rate regulator that regulates a flow rate of the refrigerant, which flows from the main refrigerant circuit into the injection passage, into the sub heat exchanger by adjustment of an opening degree of the flow rate regulator, is further disposed in the injection passage, wherein the regulating the flow rate of the refrigerant includes closing an opening for the flow of the refrigerant into the sub heat exchanger, and
the sub heat exchanger is located between the flow rate regulator and the compressor.

2. The refrigeration cycle apparatus according to claim 1, wherein the compressor provided with the injection portion has an injection port that injects the refrigerant from the injection passage into a compression chamber.

3. The refrigeration cycle apparatus according to claim 1, wherein:
the compressor is a multi-stage compressor including a low-pressure compression mechanism, a high-pressure compression mechanism, and a flow passage connecting an outlet of the low-pressure compression mechanism and an inlet of the high-pressure compression mechanism;
wherein the flow passage is the injection portion of the compressor.

4. The refrigeration cycle apparatus according to claim 1, further comprising:
a controller that controls the flow rate regulator and at least one mechanism selected from the group consisting of the first expansion mechanism and the second expansion mechanism, based on a flow rate and a temperature of the fluid in the sub heat exchanger.

5. The refrigeration cycle apparatus according to claim 1, wherein the refrigerant is carbon dioxide.

6. The refrigeration cycle apparatus according to claim 1, wherein the fluid is water,
the fluid circuit comprises a hot water storage tank and a heat exchanger that heats space, and
the refrigeration cycle apparatus is a multi-functional heat pump that is capable of heating water and space simultaneously.

7. The refrigeration cycle apparatus according to claim 6, wherein the heat exchanger that heats the space is an indoor radiator that performs the space heating by circulating hot water having been stored in the hot water storage tank, and the fluid circuit comprises:
(a) a space heating water circuit, which includes the indoor radiator; and
(b) a heat source side water circuit that is connected to the space heating water circuit, the sub heat exchanger, which cools return water that has flowed from the indoor radiator, and the radiator, which heats thereafter the cooled return water.

8. The refrigeration cycle apparatus according to claim 6, wherein the heat exchanger that heats the space is an indoor radiator that performs the space heating by circulating hot water stored in the hot water storage tank, and the fluid circuit comprises:
(a) a space heating water circuit, which includes the indoor radiator; and
(b) a heat source side water circuit in which water having been stored in a lower part of the hot water storage tank is cooled in the sub heat exchanger and thereafter heated in the radiator.

9. The refrigeration cycle apparatus according to claim 8, wherein the heat source side water circuit comprises:
a main passage including the sub heat exchanger; and
a bypass passage that branches off from the main passage at an upstream side relative to the sub heat exchanger and merges with the main passage between the sub heat exchanger and the radiator at a downstream side relative to the sub heat exchanger; and
a flow of water in the heat source side water circuit is switched between a first state in which the water in the heat source side water circuit flows only through the main passage and a second state in which the water flows only through the bypass passage.

10. The refrigeration cycle apparatus according to claim 9, further comprising:
a switching valve that switches the flow of the water in the heat source side water circuit between the first state and the second state; and a controller that controls the flow rate regulator and the switching valve, wherein the controller performs a control of the flow rate regulator and a control of the switching valve by associating the control of the flow rate regulator and the control of the switching valve with each other so that the water flows only through the bypass passage when the flow rate of the refrigerant in the injection passage is zero.

11. The refrigeration cycle apparatus according to claim 8, wherein a downstream end of the space heating water circuit is connected to a portion of the heat source side water circuit at an upstream side relative to the sub heat exchanger so that return water that has flowed from the indoor radiator is heated in the radiator after passing through the sub heat exchanger.

* * * * *